US007491121B2

(12) United States Patent
Seelig et al.

(10) Patent No.: US 7,491,121 B2
(45) Date of Patent: Feb. 17, 2009

(54) GAMING DEVICE AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 596 days.

(21) Appl. No.: 10/618,003

(22) Filed: Jul. 10, 2003

(65) Prior Publication Data

US 2004/0014521 A1 Jan. 22, 2004

Related U.S. Application Data

(60) Provisional application No. 60/394,911, filed on Jul. 10, 2002.

(51) Int. Cl.
*G06F 17/00* (2006.01)

(52) U.S. Cl. .......................................... 463/20; 463/37

(58) Field of Classification Search .................. 463/20, 463/25, 29
See application file for complete search history.

(56) References Cited

U.S. PATENT DOCUMENTS 4,200,291 A 4/1980 Hooker
4,773,647 A 9/1988 Okada et al.
4,817,951 A 4/1989 Crouch et al.
4,889,339 A 12/1989 Okada
5,695,402 A * 12/1997 Stupak ........................ 463/20
5,704,835 A 1/1998 Dietz, II
5,833,538 A * 11/1998 Weiss .......................... 463/21
5,839,957 A 11/1998 Schneider et al.
5,848,932 A 12/1998 Adams
5,984,782 A 11/1999 Inoue
5,997,401 A 12/1999 Crawford
6,024,642 A * 2/2000 Stupak ........................ 463/20
6,093,101 A 7/2000 Mourad
6,106,393 A 8/2000 Sunaga et al.
6,126,165 A 10/2000 Sakamoto
6,174,233 B1 1/2001 Sunaga et al.
6,206,781 B1 3/2001 Sunaga et al.
6,315,663 B1 * 11/2001 Sakamoto .................... 463/20
6,375,570 B1 * 4/2002 Poole .......................... 463/31
6,506,118 B1 * 1/2003 Baerlocher et al. ............ 463/25
6,790,140 B1 * 9/2004 Niwa ........................... 463/20
6,942,571 B1 * 9/2005 McAllister et al. ............ 463/20

(Continued)

FOREIGN PATENT DOCUMENTS

GB 2062922 A * 5/1981

(Continued)

*Primary Examiner*—John M Hotaling, II
*Assistant Examiner*—Tramar Harper
(74) *Attorney, Agent, or Firm*—Ian F. Burns & Associates, P.C.

(57) ABSTRACT

In one embodiment, the invention relates to a gaming device having a housing including a plurality of walls defining an enclosure. A moveable game element in located in the display area and is moveable in at least a first and second manner. A controller is located in the housing and is in communication with the moveable game element. The controller determines a game outcome, which may be a winning or losing outcome. The controller preferably moves the moveable game element in a first manner during game play and in a second manner after the controller determines a threshold number of consecutive outcomes of the same type.

52 Claims, 4 Drawing Sheets

U.S. PATENT DOCUMENTS

| | | | | |
|---|---|---|---|---|
| 2001/0041611 | A1 * | 11/2001 | Sakamoto | 463/20 |
| 2003/0013516 | A1 * | 1/2003 | Walker et al. | 463/25 |

FOREIGN PATENT DOCUMENTS

| | | | | |
|---|---|---|---|---|
| GB | 2183882 | | * | 6/1987 |
| GB | 2191030 | | * | 12/1987 |
| GB | 2222712 | | * | 3/1990 |
| GB | 2225889 | A | * | 6/1990 |
| GB | 2242300 | | * | 9/1991 |
| JP | 04164470 | | | 6/1992 |
| JP | 05003943 | | | 1/1993 |
| JP | 09000686 | | | 1/1997 |
| JP | 2001046588 | | | 2/2001 |
| JP | 20011353254 | | | 12/2001 |

* cited by examiner

GAMING DEVICE AND METHOD

CROSS REFERENCE TO RELATED APPLICATIONS

This application claims priority to, and expressly incorporates by reference, U.S. provisional application Ser. No. 60/394,911, filed Jul. 10, 2002.

BACKGROUND OF THE INVENTION

1. Field of the Invention

The present invention relates to gaming devices and, more particularly, to a gaming device and method for operating gaming devices.

2. Background

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number (for convenience, these numbers will be referred to jointly as "random numbers"). The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Some gaming devices award bonus prizes in addition to prizes that are awarded in the primary game. A bonus prize is generally defined as an additional prize that is awarded to the player when a predefined event occurs. An example of a bonus game can be found in U.S. Pat. No. 5,848,932 issued to Adams. One of the gaming devices described in this document has a primary game having three spinning game reels and a bonus game having a bonus display with one spinning wheel. The spinning wheel is divided into multiple sections, and each section has a symbol representing a prize. When predetermined indicia are displayed on the spinning game reels of the primary game, the wheel of the bonus display spins and stops. The bonus prize is displayed as the symbol on the wheel being pointed to by a pointer. The bonus prize is awarded in addition to any prizes awarded in the primary game.

A variety of visual and game play enhancements have been made to increase the appeal of gaming devices to players. Examples of some enhancements include bonus displays, additional reels, multiple pay lines, and progressive jackpots. Such enhancements have had some success in generating initial player interest and, to some extent, encouraging players to play longer. However, if players play a gaming device for too long without winning anything, they often will get discouraged and stop gaming or move on to another machine.

There are at least two factors that influence how often a gaming device will pay out, or "hit." First, there is the "pay back" percentage of the slot machine. The pay back percentage determines how much money that is gambled is returned to players in the form of prizes and how much money is kept by the game proprietor. For example, a gaming device may have a pay back percentage of 97%. This means that, for every $100 put into the gaming device, $97 will be paid back to players as prizes, while $3 will be kept by the house. Gaming devices with higher pay back percentages are referred to as being "loose." Gaming devices with lower pay back percentages are referred to as "tight."

However, the hit frequency often has a greater affect on how often a gaming device will pay out. Some gaming devices have a high hit frequency, meaning that they pay out prizes relatively often. Other gaming devices have a low hit frequency and pay out prizes relatively less often. Two gaming devices can have the same payback percentage, but have very different hit frequencies. The difference, in practice, is often a gaming device that pays a relatively large number of small prizes versus a machine that pays a smaller number of larger prizes.

The payback percentage of a gaming device is typically controlled in game machine hardware or firmware and cannot be changed without replacing a portion of the gaming device. Gaming devices are typically designed this way to comply with government regulations. Unlike what many players believe, casinos generally are not able to "tighten" or "loosen" gaming devices at will.

Similarly, many players believe that gaming devices run in streaks. For example, they may think because a gaming device has to have a certain payback percentage, a gaming device that has not hit in awhile may be due and ready to hit. Similarly, they may be reluctant to play a gaming device that has just paid off, thinking that gaming device now will not payoff for some time. In fact, in most gaming establishments, the result of each play on a gaming device is completely independent from previous plays.

No matter what other enhancements are made to gaming devices, players will often get frustrated if they think the gaming device they are playing has hit a "cold streak" and is not paying out. They may play a different gaming device, or stop playing altogether, if they become too frustrated or bored. Therefore, it would be beneficial to provide a means to encourage players to continue playing even if they have had several consecutive losing rounds of game play.

Various efforts have been made to make gaming devices more interesting and entertaining to players. For example, some attempts have been made to alter the method of operation of the gaming device. Japanese patent publication 05003943 A purports to disclose changing the rotation speed of a mechanical slot machine reel. Japanese patent publication 2001046588 A purports to suggest stopping the mechanical reels of a slot machine, and then moving at least one reel in a normal or reverse manner prior to determining a game outcome. Japanese patent publication 09000686 A appears to suggest a similar manner of slot machine operation. These references appear to apply only to the movement of the reels of a gaming device during a game round, prior to the display of the final game outcome.

Other efforts have apparently focused on providing player input devices as a means of increasing player interest and excitement. For example, U.S. Pat. No. 4,200,291 to Hooker purports to disclose a game device where a player may direct the reels of a game machine to advance one position prior to carrying out a game round. Alternatively, the player is purportedly allowed to direct selected reels not to spin during the next game round. This feature appears to be available to the player before every round of game play and appears to only move the gaming device reels in one manner.

U.S. Pat. No. 4,889,339 to Okada and U.S. Pat. No. 4,773,647 to Okada et al. purport to provide a "stop" button that a player may activate to stop rotation of gaming device reels. In one embodiment, it appears that Okada may suggest making the "stop" button active only after the reels have reached a predetermined speed of rotation.

U.S. Pat. No. 5,704,835 to Dietz, II purports to suggest an electronic slot machine that allows a player to re-spin one or more reels in order to change the outcome of a previous game round. It appears that this feature results in a new game outcome and only utilizes one manner of reel movement.

U.S. Pat. No. 5,997,401 to Crawford purports to suggest method for operating a slot machine that allows a player to save one or more symbols from previous games and use them to replace symbols in a subsequent game. It appears that the method purportedly suggested by Crawford may affect the outcome of the game and utilizes one manner of reel movement.

It would be beneficial to provide gaming devices and methods of operating gaming device that move game outcome indicators, such as mechanical reels, in a first manner during game play and a second manner in between game rounds. It would also be beneficial to provide gaming devices and methods for operating gaming devices that move game outcome indicators in between game rounds without altering, or producing, a game outcome.

SUMMARY OF AT LEAST ONE EMBODIMENT OF THE INVENTION

Advantages of One or More Embodiments of the Present Invention

The various embodiments of the present invention may, but do not necessarily, achieve one or more of the following advantages:

- encourage players to continue playing games despite the occurrence of a predetermined number of losing outcomes;
- generate player excitement and interest;
- provides the appearance to a player that the player can change his or her luck;
- provides the appearance that the player can reset the gaming device;
- provides a gaming display that may operate in a non-standard manner, creating a visually unique appearance;
- provide a display that activates game components without indicating a game outcome; and
- provide a display that activates game components without affecting a game outcome.

These and other advantages may be realized by reference to the remaining portions of the specification, claims, and abstract.

BRIEF DESCRIPTION OF AT LEAST ONE EMBODIMENT OF THE PRESENT INVENTION

In one embodiment the present invention is directed to a gaming device. The gaming device preferably has a housing that includes a plurality of walls that preferably define an enclosure. The gaming device preferably includes a moveable game element that is attached to the housing. The moveable game element may move in at least a first and a second manner. The gaming device also preferably includes a controller located within the housing and in communication with the moveable game element. The controller preferably is configured to determine a game outcome. The game outcome may be a winning or losing outcome. The controller preferably causes the moveable game element to move in the first manner when a game is played on the gaming device. The controller preferably causes the moveable game element to move in the second manner after the controller determines a number of outcomes of the same type.

In another embodiment, the present invention is directed to a gaming method. According to the gaming method, a gaming device is preferably provided. A plurality of games are preferably played on the gaming device. Each game may include placing a wager and displaying a game. The game display preferably includes a plurality of moveable objects. The moveable objects are preferably moved in a first manner during the game. The game also includes determining a game outcome, which may be a winning or losing outcome. The method also preferably includes determining the number of consecutive losing events. It is presently preferred that the moveable objects are moved in at least a second manner if the number of consecutive outcomes of the same type is at least a threshold number.

DESCRIPTION OF AN EMBODIMENT OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Figure 1:
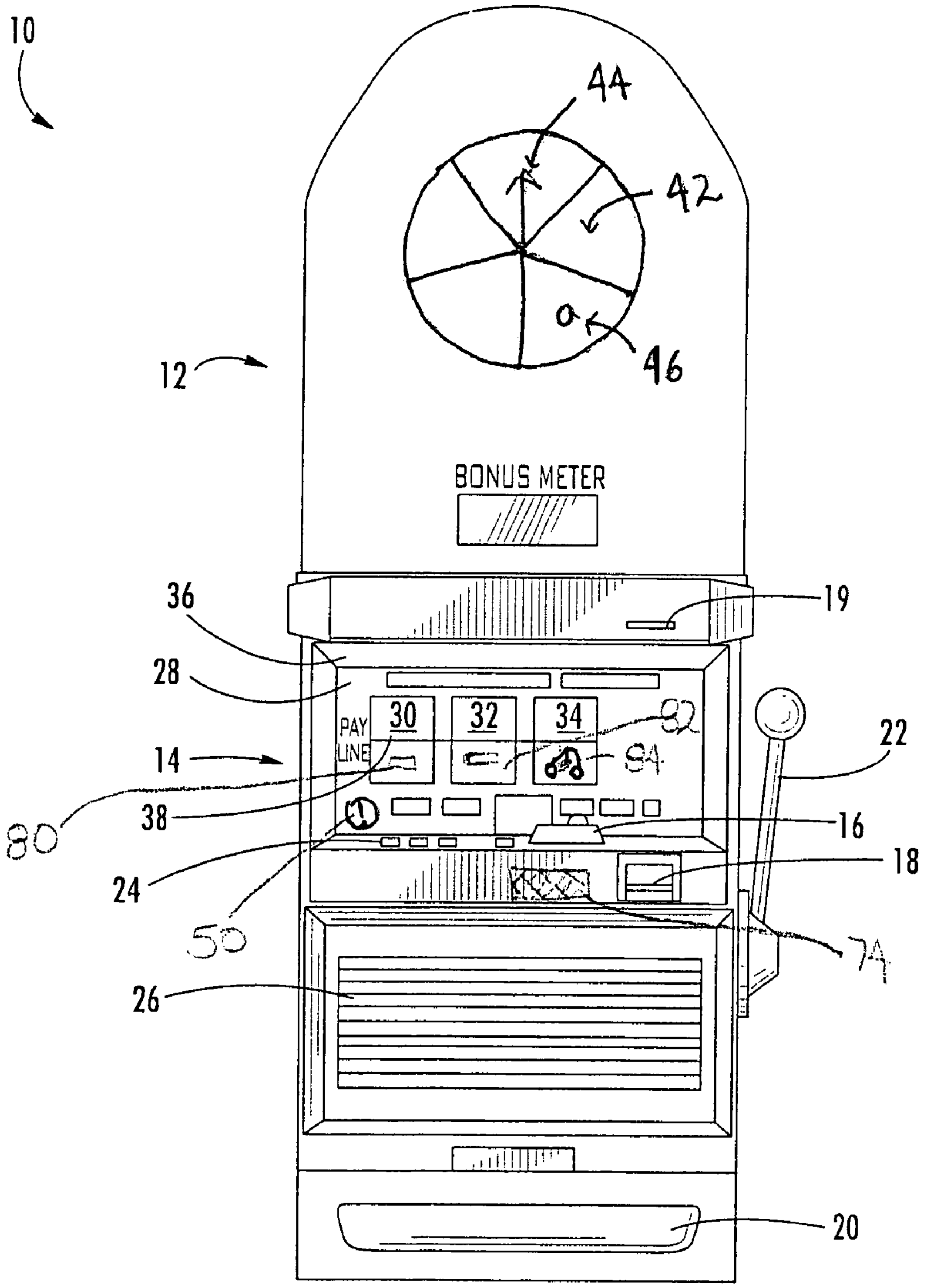
FIG. 1 is substantially a front elevational view of one embodiment of a gaming device of the present invention.

As seen in FIG. 1, the present invention comprises a gaming device, generally indicated by reference number 10. In one preferred embodiment, gaming device 10 comprises a prize display 12 and a gaming device 14. Gaming device 14 may be any of a large number of devices that are adapted to allow players to play a game, such as gaming devices typically found in arcade and casino environments, including arcade games, video games, gambling machines, video poker machines, slot machines, etc. In the preferred embodiment, gaming device 14 is further adapted to allow a player to place a wager and play a game.

Gaming device 14 may include a wager acceptor for accepting wagers, such as a coin slot 16, card reader 18, or a voucher reader 19. In addition, a payout mechanism (not shown) and a coin receptacle 20 may be provided for awarding prizes or for dispensing coins to players cashing out and retiring from a game. A printer (not shown) may also be provided for printing out cashless vouchers (not shown). A handle 22 and a button 24 may be provided for activating gaming device 14 to begin a game. A pay table (not shown) may further be provided to allow a player to see what symbol or combination of symbols provide a winning event. In at least one preferred embodiment, gaming device 14 may be an S Plus model gaming device manufactured by International Game Technology in Reno, Nev.

Gaming device 14 may further include a gaming outcome display 28 preferably positioned in front of the gaming device 14 so that a player (not shown) playing the gaming device 14 can see the gaming outcome display 28. Gaming outcome display 28 may utilize physical game reels 30, 32, and 34. Game reels 30, 32, and 34 may be attached to a drive mechanism (not shown) of gaming device 14 to rotate the reels in a manner well known in the art. Each game reel 30, 32, and 34 preferably has a plurality of symbols (not shown) positioned on the circumference of each game reel 30, 32, and 34. Game reels 30, 32, and 34 may be positioned side-by-side with coincident axes of rotation and a portion of their individual circumferences preferably faces outward from gaming device 14.

Of course, game outcome indicators other then mechanical reels can be used in gaming outcome display 28. For example, video reels could be used. Also, mechanical or video prize wheels could be used in the present invention. The present invention is not limited to any particular type of game outcome indicator.

A panel 36 preferably covers game reels 30, 32, and 34 such that only a portion of their individual circumferences is shown to the player. At least one symbol from any of game reels 30, 32, and 34 may be used to display a game outcome. At least one pay line 38 may be provided for the player to use in determining a game outcome based on the symbol or a combination of symbols positioned thereon. In an alternative embodiment, gaming outcome display 28 utilizes a video display (not shown) configured to display images of game reels and an image of at least one pay line. A video display may also display game symbols in many other formats and arrangements, such as playing cards.

Gaming device 10 preferably further includes a prize display 12 configured to display at least one game and prize indicator to a player. Prize display 12 is most preferably configured to display a bonus game and at least one bonus prize indicator to the player. In other embodiments, prize display 12 may provide a primary game. Alternatively, prize display 12 may be a stand-alone device allowing a player to place a wager and play a game.

In the preferred embodiment, prize display 12 is attached to gaming device 14 and positioned on top of gaming device 14. In other embodiments (not shown), prize display 12 may be separate from gaming device 14 but in communication with gaming device 14. In this embodiment, prize display 12 may be in communication with a plurality of different gaming devices 14 via a computer network in a manner that is well known in the art. Prize display 12 may also be positioned adjacent to or remote from gaming device 14. In other embodiments, prize display 12 is a stand-alone display not in communication with gaming device 14, and it may be capable of independently accepting wagers, conducting games, and awarding prizes to a player.

FIG. 1 also illustrates a player input device 50. Although illustrated as a button in FIG. 1, input device 50 could be any number of input devices known to the art, such as handles, joysticks, keypads, or touch screens. Input device is preferably in communication with the drive mechanism of reels 30, 32, and 34.

In a preferred embodiment, gaming device 10 informs a player that input device 50 is active. This may be accomplished in a number of ways and the particular method chosen does not affect the scope of the present invention. For example, input device 50 may be fitted with an indicator, such as a light that may be illuminated by controller 60 (see FIG. 2) when input device 50 is active. Alternatively, display 28 can be modified to include a suitable indicator.

Figure 2:
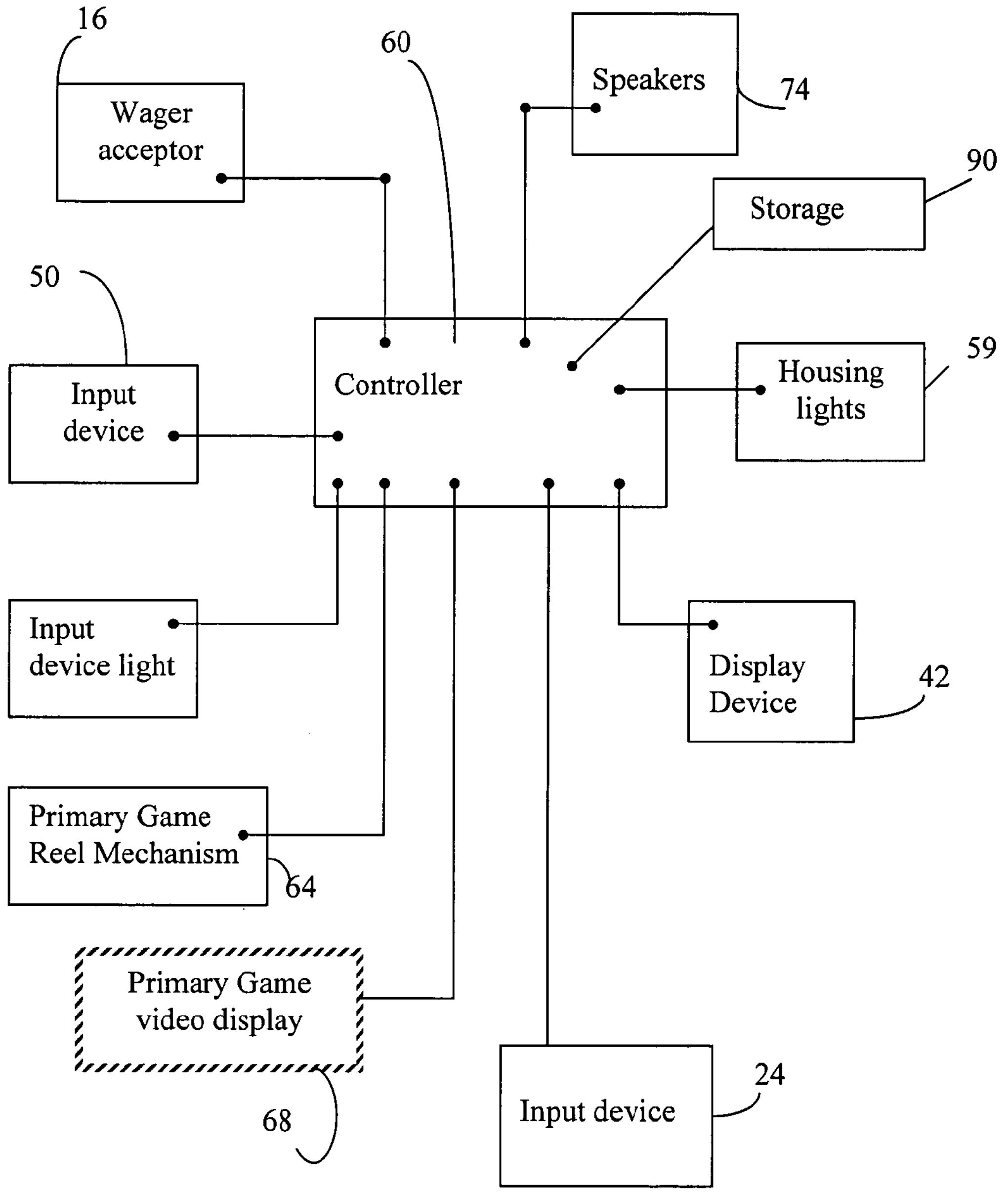
FIG. 2 is substantially a schematic diagram of a gaming device of the present invention.

Referring now to FIG. 2, a schematic diagram of the components included in the preferred embodiment of gaming device 10 is shown. The preferred gaming device 10 preferably includes a wager acceptor 16 configured to accept wager in the form of paper currency, coins, player card, vouchers, or other wagers known in the art. Wager acceptor 16 is preferably in communication with controller 60. Controller 60 may be in communication with an input device 24. Controller 60 may detect introduction of a wager into wager acceptor 16 and may prompt player to start a game by activating an input device 24. Once controller 60 senses a signal to start the game, controller 60 is configured to produce a random number and activate gaming device's 14 reel mechanism 64.

Reel mechanism 64 is configured to display indicia on reels 30, 32, and 34 according to the random number generated by controller 60. Alternatively, controller 60 may be configured to produce a random number and activate gaming device's 14 video display of reels 68. The video display of reels 68 may be configured to display indicia in video form according to the random number generated by controller 60. It is noted that the primary game of gaming device 14, whether in physical form or in video form, is not limited to reel-type games, but may include card games, dominoes, roulette, craps, baccarat, and other games known in the art.

The preferred embodiment of gaming device 10 further includes speaker 74 (shown in FIG. 1), housing lights 59, display device 42, indicator 44, and indicator 64 in communication with controller 60. Controller 60 preferably stores bonus event information and has the ability to detect bonus events. Upon an occurrence of a bonus event, controller 60 preferably activates speaker 74, housing lights 59, and display device 42. Controller 60 may then cause indicator 44 to stop to indicate an indicia 46 on display device 12. Housing lights 59 and speaker 74 together preferably create a festive and lively winning atmosphere to elicit interest and entertainment from both the player and adjacent patrons. In the preferred embodiment, when gaming device 10 is not in use, indicator 44, housing lights 59, and display speaker 74 are preferably activated by controller 60 in an attract mode. Housing lights 59 may operate, blink or flash, and indicator 44 may move. Controller 60 preferably activates display device 12, and indicator 44 upon the occurrence of a bonus event.

According to Applicants' invention, a game player may be given an opportunity to trigger a game event involving movement of game display elements in the absence of an active game. This feature will be referred to as the "change your luck" feature. The player is preferably given this opportunity after a number of losing game rounds have been conducted. Alternatively, gaming device 10 may be configured to automatically initiate the "change your luck" feature without prompting the player and without player input.

The movement of game display elements is preferably random and or erratic. The display elements preferably move in a different way than when the game elements are moved in an actual game. Non-standard movements are useful for at least two reasons. First, non-standard movements may reduce the risk of the player believing that the game device is in game play mode. Second, erratic movement may generate more player excitement and contribute to a feeling that something out of the ordinary is occurring. The player may believe that the gaming device has somehow been altered, or reset, and that the player's luck has changed and the gaming device will begin to pay out.

Erratic movement may include game elements moving in a manner that is different than normal game play. Game elements may also move at different speeds. For example, on a three reel slot machine of FIG. 1, the two outside reels 30 and 34 could rotate in an opposite direction from the rotational direction used in a game play mode. Center reel 32 could rotate as normal. All three reels could rotate faster or slower than normal. Alternatively, some reels could rotate at normal speed and other reels could rotate faster or slower than normal. Of course, other types of movements could be used without departing from the scope of the presentation, as could different combinations of movements.

Preferably, the images displayed on the game elements, for example indicia 80, 82, and 84 on reels 30, 32, and 34, are returned to the same position as before the movement event was initiated. By displaying identical symbols before and after movement, players are less likely to believe that a game play round has occurred and/or that they are entitled to a prize as a result of the movement event. Alternatively, reels 30, 32, and 34 could display different symbols than the previous game outcome. Preferably, the different symbols are chosen such that a non-winning outcome is displayed and the chance for player confusion is reduced.

Figure 3A:
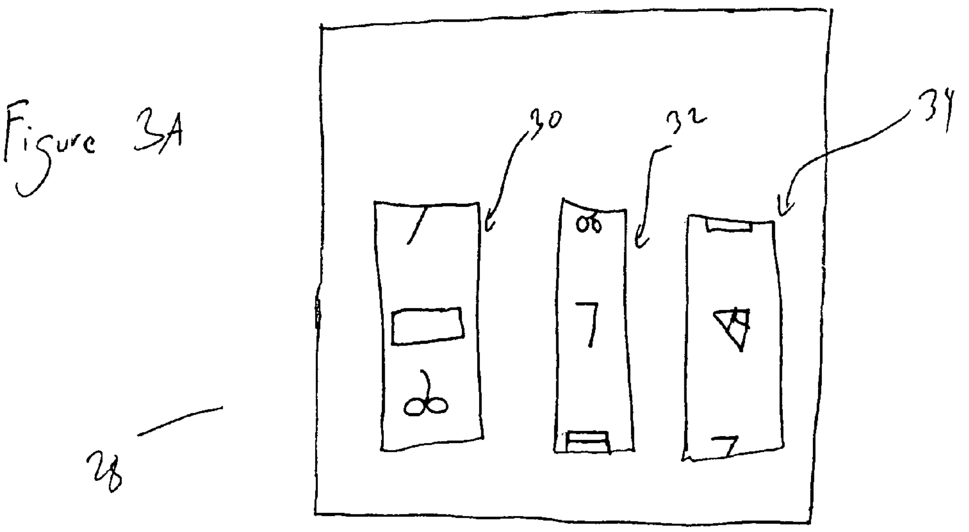
FIG. 3 is substantially a front elevational view of a display of a gaming device of the present invention illustrating a method of operation of the present invention.
Figure 3B:
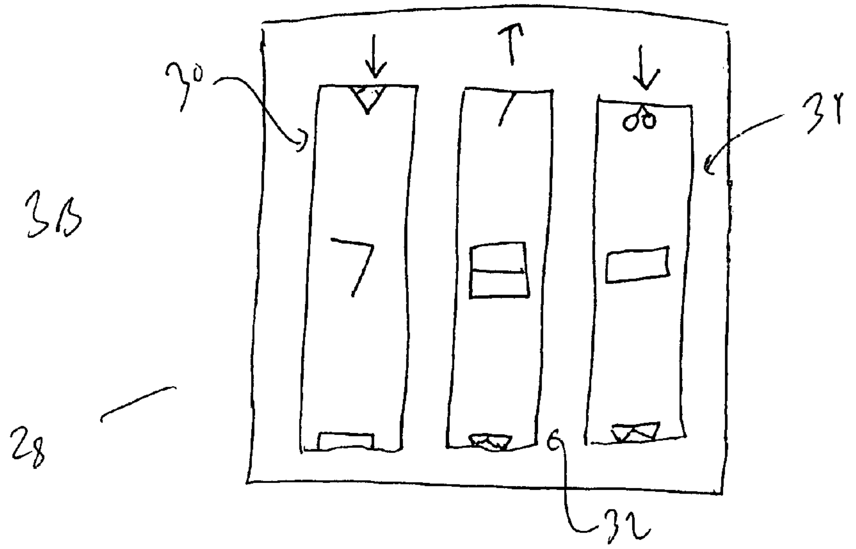
Figure 3C:
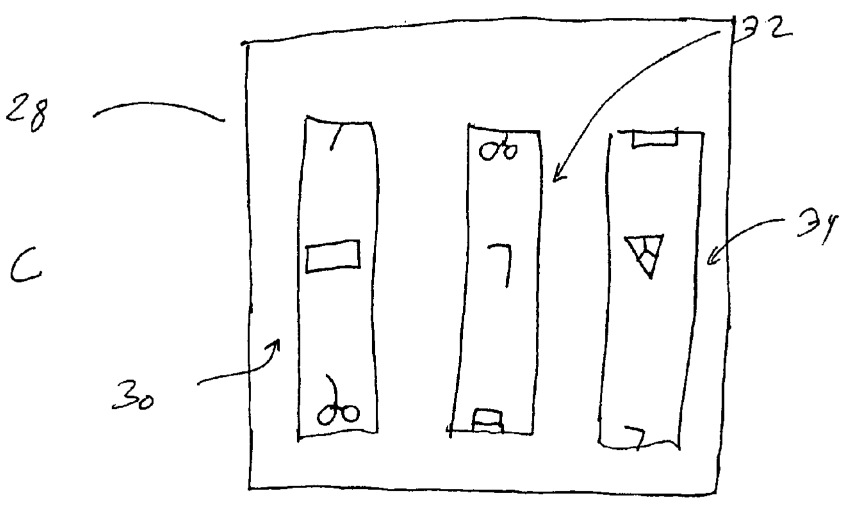
Figure 4:
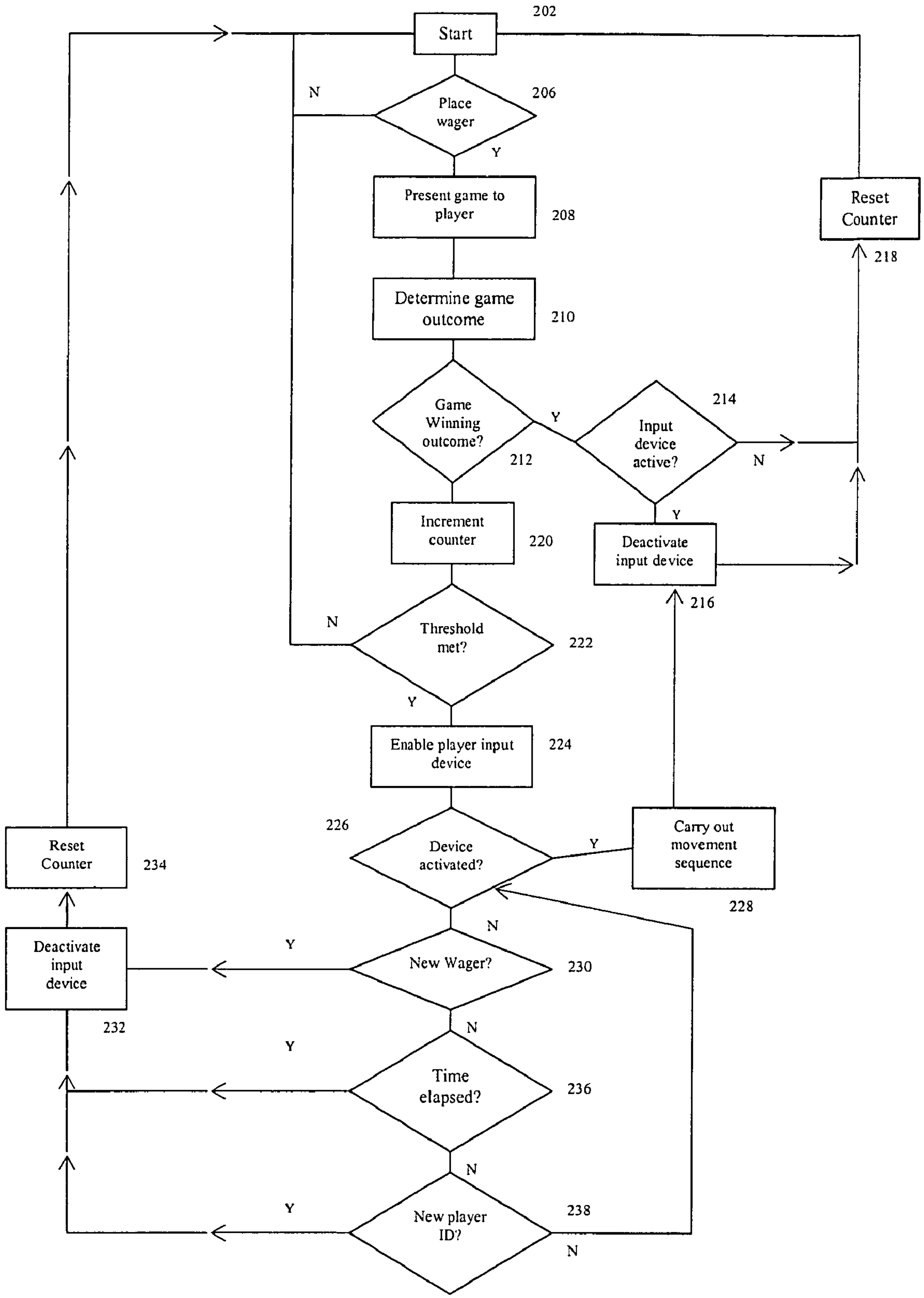
FIG. 4 is substantially a flow chart of a gaming method according to the present invention.

An example of the "change you luck" feature is illustrated in FIGS. 3A-3C. FIG. 3A shows gaming outcome display before the "change your luck" feature is activated. According to the previous game's outcome, reel 30 displays a bar, reel 32 displays a "7", and reel 34 displays a diamond. FIG. 3B illustrates how reels 30, 32, and 34 may move. Reels 30 and 34 move in a downward direction, while center reel 32 moves in an upward direction. FIG. 3C illustrates the position of reels 30, 32, and 34 after the completion of the "change your luck" feature. Reels 30, 32, and 34 are the position they were in after the previous game outcome, as illustrated in FIG. 3A.

In addition to, or in place of, moving game elements, other elements of gaming device 14 may be used for the "change your luck" feature. For example, gaming device 14 could be made to appear to reset itself. Lights, including housing lights 59, could dim or turn off. After a time period, the lights could turn back on. Because gaming device 14 appears to have been reset, the player may believe that their luck will change. In addition, making gaming device 14 appear to reset provides a change from normal game play and presents an interesting display to the player.

The "change your luck" feature is preferably made available to the player after a number of losing events have occurred. In one embodiment, the "change your luck" feature is made available to the player after a predetermined number of consecutive losing events. For example, every time a player loses 8 times in a row, the player may choose to activate the "change your luck" feature.

Alternatively, the "change your luck" feature could be made available to a player after a randomly determined number of loses have occurred. The random number could be bounded. For instance, the feature could be activated after at least 5 loses have occurred, but would be activated before 15 loses have occurred.

The "change your luck" feature could be configured to activate other than after a threshold number of consecutive losing outcomes. For example, the feature could be made available to the player at any time. The feature could be made available after a consecutive number of outcomes of any type, including winning outcomes. Alternatively, the "change your luck" feature could be made available based on percentage of losing outcomes or percentage of losing outcomes over a particular time period. This embodiment might be particularly beneficial for players who have received a large number of losing outcomes, but who might not have enough consecutive losing outcomes to otherwise activate the "change you luck" feature.

The player need not be required to activate the "change your luck" feature. The player may ignore the feature and continue game play or cease game play as desired. If the player chooses not to activate the feature when it became available, the feature could remain active until the player won a round of game play. For example, activation of input device 50 may cause indicator 44 to move erratically, such as in different directions and/or speeds than those used in normal game play. Alternatively, the feature could be reset once a round of game play is completed without activation of the feature.

The feature preferably turns off after a set time period has passed. For example, if no play on the machine has been initiated after 90 seconds, the feature could deactivate and any indicators regarding the feature would preferably be disabled. The feature could also be disabled if the player "cashed out" his or her winnings. If additional credits are inserted into the gaming device, or a player tracking card is inserted into the gaming device, the "change your luck" feature may be reset.

The "change your luck" feature may be used in conjunction with a bonus game in addition to, or in place of, being used with a primary game. For example, a "change your luck" event triggered by events on the primary game could move elements of the bonus game, in addition to elements of the primary game. Alternatively, losing, or low value bonus prizes (including consolation prizes) could be set to trigger a "change your luck" event. Such bonus game initiated events may involve movement of only bonus game components, or could also move elements of the primary game.

Input device 50 is preferably in communication with controller 60. When controller 60 detects that input device 50 has been activated, controller 60 preferably directs reels 30, 32, and 34 to move in an erratic fashion. Controller 60 preferably contains software code, reel drivers, that directs the operation of reels 30, 32, and 34. The software preferably controls the direction and speed of rotation of reels 30, 32, and 34. Those of skill in the art may suitably modify the software in order to carry out the methods of the present invention.

The program could be stored in any suitable fashion, such as in storage device 90. For example, the program could be stored in EPROM. However, the program could also be stored on a hard drive or other suitable media. The reel drivers may be stored on any suitable known or later developed device. In addition, the reel drivers may be implemented in any suitable programming language.

However, the above described embodiment is not limiting. For example, game controller 60 may be in communication with a second controller, such as a reel motor controller associated with reels 30, 32, and 34. Game controller 60 may signal the second controller that the "change your luck" movement should be carried out. Additionally, the "change your luck" movements need not be software controlled, but could be controller through circuits or mechanical means. Additionally, the "change your luck" feature may be implemented in different ways/by different processors for the primary game and a bonus game. Rather than enabling input device 50, game control 60 may automatically initiate the "change your luck" feature upon the occurrence of a predetermined set of conditions.

Method of Operation of One Embodiment

A flowchart illustrating the operation of one embodiment of the invention is presented in FIG. 3. The method starts at 202, which may be the presentation of a game to a player. The player may place a wager at decision 206. If no wager is placed, the method returns to 202. If a wager is placed, a game is presented to a player at step 208 and a game outcome is determined at step 210.

At decision 212, the method determines whether the outcome of step 210 was a game winning outcome. If the game outcome was a winning outcome, decision 214 checks to see if player input device 50 was enabled. If so, the device is deactivated at step 216. After deactivation of player input device 50, or if device 50 was not activate at decision 215, a losing outcome counter is reset at step 218. The process then returns to step 202.

If the game outcome was not a winning outcome at step 212, the losing outcome counter is incremented at step 220. After incrementing the counter, decision 222 checks to see if a threshold number of consecutive losing events has occurred. If the threshold has not been met, the process returns to step 202.

If the threshold has been met at decision 222, the method proceeds to enable player input device 50 at step 224. The player then has the option to activate player input device 50. If player input device 50 is activated by the player, the "change your luck" movement sequence is carried out at step 228, the input device is deactivated at step 216, the counter is reset at step 218, and the method returns to step 202.

If the player does not activate player input device 50 at step 226, the method proceeds to decision 230 that checks to see if the player has placed a new wager. If a new wager has been placed in decision 230, the method may be configured to deactivate player input device 50 at step 232, reset the counter at step 234, and return to step 202. Of course, the method may be configured differently and still fall within the scope of the present invention.

If a new wager is not detected at decision 230, the method may proceed to decision 236 and check to see if a predetermined time limit has elapsed. If the time period has elapsed, the method proceeds to steps 232 and 234 as described above, returning to step 202.

If the time period has not elapsed at step 236, the method may proceed to step 238 and determine whether a new player identification has been detected, such as by insertion of a player tracking card. If a new player identification has been detected, the method may proceed to steps 232 and 234 as described above, returning to step 202. If a new player identification is not detected, the method may return to step 226.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A gaming device comprising:

(A) a housing;

(B) a plurality of mechanical reels located in the housing, the mechanical reels being rotatable about an axis, the mechanical reels being moveable in at least a first and a second manner, the mechanical reels being moveable independently of each other;

(C) a player input device coupled to the housing, the player input device in communication with a controller, the player input device being adapted to be activated by a player; and (D) the controller in communication with the mechanical reels and the player input device, the controller enabling the player input device after an occurrence of a consecutive number of losing outcomes and when no game is being played and disabling the player input device while a game is being played, the controller causing at least one of the mechanical reels to move in a the first manner when a game is played and to allow the player to cause at least one of the mechanical reels to move in the second manner when the game is not being played without altering or producing a game outcome, the game outcome comprising a winning or losing outcome, and after the player has activated the player input device.

2. The gaming device of claim 1 wherein the controller contains software that is operable to direct at least one of the mechanical reels to move in the second manner after the player activates the player input device.

3. The gaming device of claim 1 wherein the number of losing outcomes is predetermined.

4. The gaming device of claim 1 wherein the number of losing outcomes is randomly determined.

5. The gaming device of claim 1 wherein the player input device causes at least one mechanical reel to move in the second manner.

6. The gaming device of claim 1 further comprising a bonus game display having a moveable bonus indicator, the moveable bonus indicator moving in a first direction during game play, wherein activation of the player input device causes the bonus indicator to move in at least a second direction.

7. The gaming device of claim 6, further comprising a second controller in communication with the controller.

8. The gaming device of claim 1 wherein the first manner of movement comprises movement in a first direction and the second manner of movement comprises movement in a second direction.

9. The gaming device of claim 1 wherein the first manner of movement comprises movement at a first speed and the second manner of movement composes movement at a second speed.

10. A gaming method comprising:

(A) providing a gaming device having a game display;

(B) displaying a game on said gaming device utilizing a plurality of moveable objects, and moving the moveable objects in a first manner during game play, wherein game play comprises determining a game outcome comprising a winning or losing outcome;

(C) locating the moveable objects in a first position associated with the game outcome;

(D) determining a number of consecutive losing outcomes;

(E) providing a player input device;

(F) giving a player an opportunity to activate the player input device; and (G) moving the moveable objects in at least a second manner when the game is not being played without altering or producing any game outcome, and if the player activates the player input device, movement of the moveable objects in the first manner being different from movement of the moveable objects in the second manner.

11. The method of claim 10 further comprising enabling the player input device if the number of consecutive losing outcomes is at least a threshold number.

12. The method of claim 11 wherein the threshold number is predetermined.

13. The method of claim 11 wherein the threshold number is randomly determined.

14. The method of claim 10, further comprising disabling the player input device when a game is being played.

15. The method of claim 10, further comprising disabling the player input device if a predetermined time period elapses without activation of the player input device.

16. The method of claim 10, further comprising disabling the player input device if a cash-out event occurs.

17. The method of claim 10 further comprising determining a first player identification and disabling the player input device if a second player identification is determined.

18. The method of claim 10 further comprising:

(A) providing a bonus game, the bonus game comprising a moveable game element, the moveable game element in communication with the controller, and moving the moveable game element in a first manner during game play; and (B) moving the moveable game element in a second manner when the player activates the player input device.

19. The method of claim 10 wherein activation of the player input device does not affect outcomes of any subsequently played games.

20. The method of claim 10, further comprising returning the moveable objects to the first position the moveable objects were in prior to activation of the player input device.

21. The method of claim 10 wherein the first manner of movement comprises movement in a first direction and the second manner of movement comprises movement in a second direction.

22. The method of claim 10 wherein the first manner of movement comprises movement at a first speed and the second manner of movement comprises movement at a second speed.

23. A gaming method comprising:

(A) providing a gaming device having a game display and a player input device;

(B) playing a plurality of games on said gaming device comprising (a) accepting a wager;

(b) presenting a game, the game display comprising a plurality of moveable objects, the moveable objects being moved in a first manner during game play, wherein game play comprises determining a game outcome comprising a winning or losing outcome; and (c) locating the moveable objects in a first position associated with the game outcome;

(C) determining a number of consecutive losing outcomes; and (D) moving the moveable objects in at least a second manner without altering or producing any game outcome, if a number of consecutive outcomes of a same type is at least a threshold number and if the game is not being played, wherein step D occurs after step B(b).

24. The method of claim 23 wherein the threshold number is predetermined.

25. The method of claim 23 wherein the threshold number is randomly determined.

26. The method of claim 23, further comprising disabling the player input device when a game is played.

27. The method of claim 23, further comprising disabling the player input device if a predetermined time period elapses without activation of the player input device.

28. The method of claim 23, further comprising disabling the player input device if a cash-out event occurs.

29. The method of claim 23, further comprising recording a first player identification and disabling the player input device if a second player identification is recorded.

30. The method of claim 23 wherein each movable object has at least one of a plurality of indicia mounted thereon.

31. The method of claim 23 further comprising moving the moveable objects to the first position they were in prior to activation of the player input device.

32. The method of claim 23 wherein the first manner of movement comprises movement in a first direction and the second manner of movement comprises movement in a second direction.

33. The method of claim 23 wherein the first manner of movement comprises movement at a first speed and the second manner of movement comprises movement at a second speed.

34. The method of claim 23, further comprising:

(A) providing a bonus game having a moveable game element, and moving the game element in a first manner during game play; and (B) moving the game element in a second manner when a player activates the player input device.

35. The method of claim 23 wherein activation of the player input device does not affect outcomes of any subsequently played games.

36. The method of claim 23 wherein the number of consecutive outcomes of the same type comprises a threshold number of consecutive losing outcomes.

37. A gaming device comprising:

(A) at least one housing;

(B) a moveable game element attached to the housing, the moveable game element being moveable in at least a first and second manner; and (C) a controller in communication with the moveable game element, the controller being configured to move the moveable game element in the first and second manner, the controller determining a game outcome, the game outcome comprising a winning or losing outcome, the controller causing the moveable game element to move in the first manner when a game is played and to move in the second manner without altering or producing any game outcome when the game is not being played and after the controller determines a number of consecutive outcomes of a same type.

38. The gaming device of claim 37 further comprising a video display attached to the housing, the moveable game element appearing as an image on the video display.

39. The gaming device of claim 38 wherein the moveable game element comprises an image of a spinning reel comprising a plurality of indicia, the reel being spinnable about a horizontal rotational axis.

40. The gaming device of claim 37 wherein the first manner of movement comprises movement in a first direction and the second manner of movement comprises movement in a second direction.

41. The gaming device of claim 37 wherein the first manner of movement comprises movement at a first speed and the second manner of movement comprises movement at a second speed.

42. The gaming device of claim 37 further comprising a bonus game display having a moveable bonus indicator that is adapted to move in a first direction during game play and to move in at least a second direction when the controller directs the moveable game element to move in the second manner.

43. The gaming device of claim 37 further comprising a player input device in communication with the controller, wherein the controller enables the player input device after the controller determines a number of losing outcomes.

44. The gaming device of claim 37 wherein the number of consecutive outcomes of the same type comprises a threshold number of losing outcomes.

45. The gaming device of claim 37 wherein the number of consecutive outcomes of the same type comprises a threshold number of winning outcomes.

46. A gaming device comprising:

(A) housing means for holding game components;

(B) display means mounted in the housing means for displaying a game, the game comprising a moveable indicating means for displaying game indicia, the moveable indicating means moveable in at least a first and a second manner;

(C) controller means in communication with the display means, the controller means determining a game outcome, controlling the display means, and determining a number of losing outcomes, wherein the game outcome comprises a winning or losing outcome;

(D) means for moving the display means in a first manner during game play; and (E) means for moving the display means in a second manner without altering or producing any game outcome after the controller determines a threshold number of consecutive losing outcomes.

47. The gaming device of claim 46 further comprising a player input means, the controller means enabling the player input means after the controller means determines a threshold number of consecutive losing outcomes.

48. The gaming device of claim 47 further comprising a movable bonus indicating means for indicating a bonus game outcome, the bonus indicating means in communication with the controller means, the bonus indicating means moveable in at least a first and second manner, the bonus indicating means moving in the first manner during game play and moving in the second manner when the player input means is activated.

49. The gaming device of claim 46 wherein the first manner of movement comprises movement in a first direction and the second manner of movement comprises movement in a second direction.

50. The gaming device of claim 46 wherein the first manner of movement comprises movement at a first speed and the second manner of movement comprises movement at a second speed.

51. A gaming method comprising:

(A) providing a gaming device having a game display;

(B) displaying a game on said gaming device utilizing a plurality of moveable objects comprising moving the moveable objects in a first manner during game play;

(C) determining a game outcome, the game outcome comprising a winning or losing outcome and locating the moveable objects in a first position;

(D) determining a number of consecutive losing outcomes;

(E) providing a player input device;

(F) giving a player an opportunity to activate the player input device;

(G) moving the moveable objects in at least a second manner when the game is not being played and if the player activates the player input device without altering or producing any game outcome, movement of the moveable objects in the first manner being different from movement of the moveable objects in the second manner, wherein step G occurs after steps B and F; and (H) returning the moveable objects to the first position that the moveable objects were in prior to activation of the player input device.

52. A gaming method comprising:

(A) providing a gaming device having a game display and a player input device;

(B) playing a plurality of games on said gaming device comprising:

(a) accepting a wager;

(b) presenting a game, the game display comprising a plurality of moveable objects;

(c) moving the moveable objects in a first manner during game play; and (d) determining a game outcome, the game outcome comprising a winning or losing outcome and locating the moveable objects in a first position;

(C) determining a number of consecutive losing outcomes;

(D) moving the moveable objects in at least a second manner if a number of consecutive outcomes of a same type is at least a threshold number and if the game is not being played without altering or producing any game outcome, wherein step D occurs after step B(c); and (E) moving the moveable objects to the first position they were in prior to activation of the player input device.

* * * * *